United States Patent
Wen et al.

[11] Patent Number: 6,130,741
[45] Date of Patent: Oct. 10, 2000

[54] EMBEDDING INFORMATION IN A DIGITAL IMAGE DIGITIZED FROM A DEVELOPED PHOTOGRAPHIC FILM

[75] Inventors: Xin Wen, Rochester; Chris W. Honsinger, Webster, both of N.Y.

[73] Assignee: Eastman Kodak Company, Rochester, N.Y.

[21] Appl. No.: 09/405,591

[22] Filed: Sep. 27, 1999

[51] Int. Cl.[7] .............................. G03B 27/52; G06K 9/00; G06K 15/316; H04L 9/00

[52] U.S. Cl. ........................... 355/40; 382/100; 382/279; 380/4

[58] Field of Search ..................................... 396/311, 312, 396/429; 358/487; 355/18, 40, 41; 382/100, 279; 380/59, 4

[56] References Cited

U.S. PATENT DOCUMENTS

| | | | |
|---|---|---|---|
| 5,546,145 | 8/1996 | Bernardi et al. ........................... | 354/76 |
| 5,634,158 | 5/1997 | Shon et al. ............................... | 396/320 |
| 5,710,834 | 1/1998 | Rhoads . | |
| 5,758,216 | 5/1998 | Arnold ..................................... | 396/311 |
| 5,819,289 | 10/1998 | Sanford, II et al. ...................... | 380/28 |
| 5,822,436 | 10/1998 | Rohoads .................................. | 380/54 |
| 5,835,639 | 11/1998 | Honsinger et al. . | |
| 5,859,920 | 1/1999 | Daly et al. . | |
| 5,930,377 | 7/1999 | Powell et al. ............................ | 382/100 |
| 6,044,182 | 3/2000 | Daly et al. ............................... | 382/284 |

OTHER PUBLICATIONS

Optical Engineering, Aug. 1990, vol. 29. No. 8, pp. 977–987, "Application of a Noise–Adaptive Contrast Sensitivity Function to Image Data Compression" by Scott Daly.

"Foundations of Vision" by Brian A. Wandell, 1995, pp. 111 and 136.

*Primary Examiner*—Russell Adams
*Assistant Examiner*—Khaled Brown
*Attorney, Agent, or Firm*—Raymond L. Owens

[57] ABSTRACT

Apparatus for embedding information in a digital image digitized from a developed photographic film in response to a film property and information to be embedded into the digital image includes a scanner for scanning the image on the developed photographic film to produce the digital image. The apparatus stores the film property and has input circuitry for storing information associated with the image and to be embedded in the digital image. The apparatus responds to the stored the film property and the associated information for modifying a predetermined number of pixel values with the associated information in the digital image so that the associated information is embedded in the digital image, wherein the embedded information can subsequently be extracted.

20 Claims, 4 Drawing Sheets

EMBEDDING INFORMATION IN A DIGITAL IMAGE DIGITIZED FROM A DEVELOPED PHOTOGRAPHIC FILM

CROSS REFERENCE TO RELATED APPLICATIONS

Reference is made to the commonly-assigned U.S. patent application Ser. No. 09/339,755, filed Jun. 24, 1999, entitled "Recording Invisible And Detectable Information In Photographic Images" by Xin Wen, and commonly-assigned U.S. patent application Ser. No. 09/405,590 filed concurrently herewith entitled "Embedding Information in a Printed Image", by Xin Wen et al, the disclosures of which are incorporated herein by reference.

FIELD OF THE INVENTION

This invention relates to producing digital mages from scanned photographic film.

BACKGROUND OF THE INVENTION

Photography is a popular method for people to record and remember their memories of past experiences. Photographic images can be captured by a photographic film or a solid state image sensor. Film-based photography is an analog process. An optical system forms an image of a scene on a film coated with a photosensitive material, most commonly silver halide emulsion grains. The exposure to photons activates a photochemical process in the silver halide emulsion grains, producing a latent image of the scene on the film. A latent image carries the information of the scene image, but it is not visible to human eyes. Subsequent development of the film containing the latent image can produce a visible image formed by dye molecules. The dye image on the photographic film can then be reproduced on a photographic paper. The exposed photographic films can be developed either in a central location, typically referred as a Central Lab, or a distributed site, which can be called as either a Minilab or a Microlab depending on the size and the throughput of the site. The traditional development and printing processes of the silver halide films, as described above, all involve wet chemical and analog processes. With the advancement of computer and imaging technologies in recent years, a demand has been created to provide users digital photographic services. By using digital methods, photographic images can be more readily received from and provided to users in various digital formats.

One problem that has arisen from the usage of digital images is the detection of the unauthorized use of copyrighted or personal images. It is known that the professional photographers have been greatly concerned about the illegitimate use of their copyrighted images in the recent years. As the use of Internet and digital imaging devices become more popular, this concern will spread to the common consumers.

SUMMARY OF THE INVENTION

An object of the present invention is to provide high quality digital images scanned from developed photographic film which have embedded information that is invisible when printed on a receiver.

This object is achieved by apparatus for embedding information in a digital image digitized from a developed photographic film in response to a film property and information to be embedded into the digital image, comprising a) a scanner for scanning the image on the developed photographic film to produce the digital image;

b) means for storing the film property;

c) input means for storing information associated with the image and to be embedded in the digital image; and d) means responsive to the stored film property and the associated information for modifying a predetermined number of pixel values with the associated information in the digital image so that the associated information is embedded in the digital image, wherein the embedded information can subsequently be extracted.

An important feature of the present invention is that the information embedding is particularly suitable for use in existing photographic processes such as provided by Microlabs, Minilabs and Central Labs.

An advantage of the present invention is that the high quality of the developed photographic image is preserved in the digital images even though it contains embedded information.

Another advantage of the present invention is that the amount and the reliability of the embedded information can be optimized depending on the film property.

A further advantage of the present invention is that the embedded information can be varied according to the user's input, thereby permitting adding personal messages and authenticating information.

DETAILED DESCRIPTION OF THE INVENTION

The present invention relates to an apparatus for embedding information in digital images scanned from developed photographic films. One important feature of the present invention is that the information embedding is conducted in response to a film property and the user input. In the present invention, the term "film property" includes one or more of the following properties: film speed, film type (e.g. 35 mm, APS, negative or positive, and black and white), APS format (Classic, panoramic, HDTV), or exposure conditions. The information is embedded into the digital images according to the film property so that the high photographic image quality is preserved in the digital images even with the embedded information. The film property is also used for maximizing the amount and the reliability of the embedded information. In the present invention, the term "quality" or "image quality" refers to the image properties that define the visual effects of an image and the fidelity of the reproduced image compared to the original image. Such image properties can include grain noise, tone scale, color reproduction, sharpness, and the severity of image artifacts, which are well known in the imaging field.

In accordance with the present invention, the more noise a film-based image has, the more data can be embedded into the image without affecting the quality of the image. That means that more data can be embedded in an image developed from a high-speed film than from a lower speed film.

Figure 1:
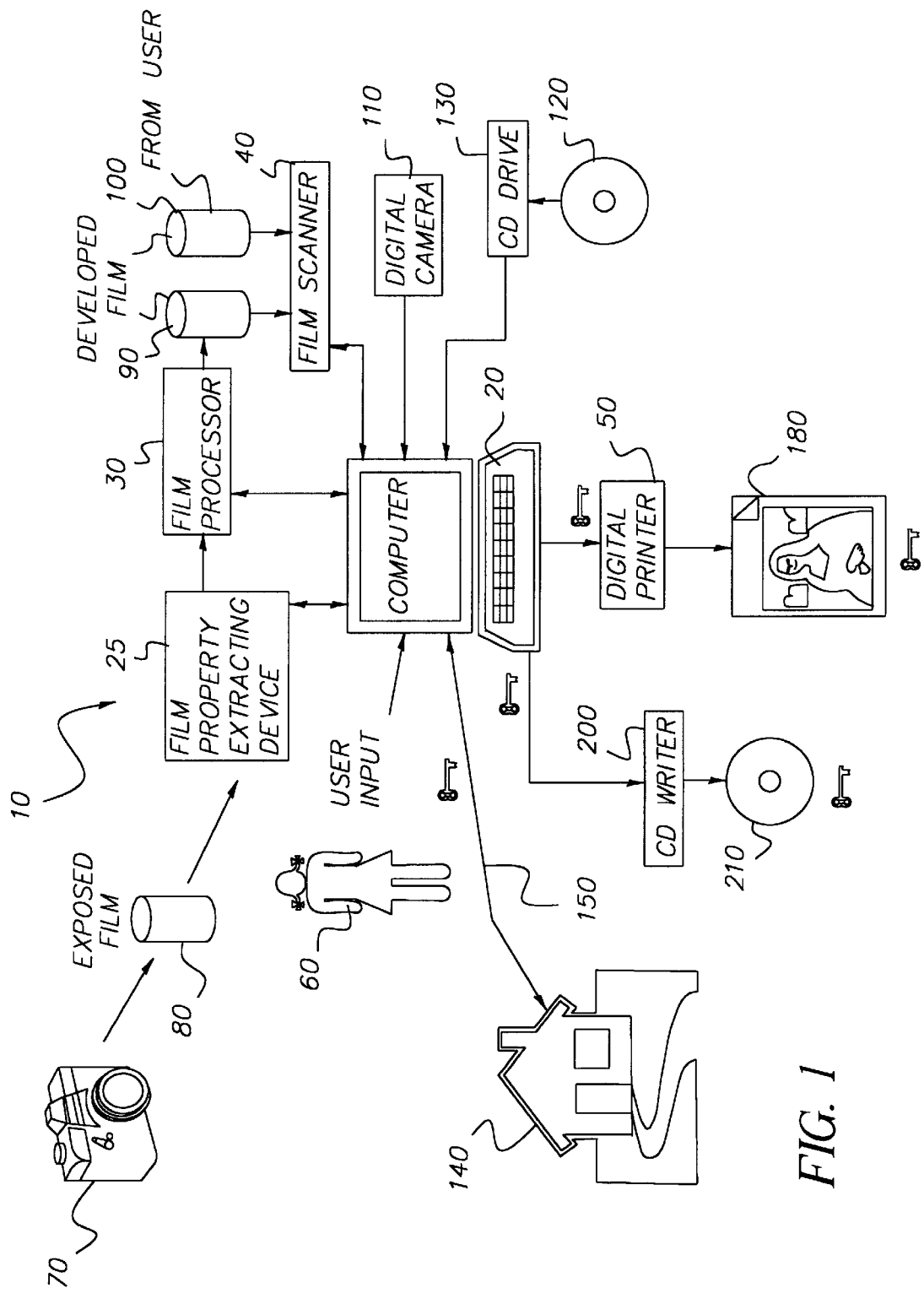
FIG. 1 shows an apparatus for embedding information in digital images scanned from developed photographic film, the information embedding is dependent on a film property and the user input in accordance to the present invention.

FIG. 1 shows an apparatus 10 in accordance with the present invention. The apparatus 10 includes a computer 20, film property extraction device 25 for extracting one or more film properties as described above, a film processor 30, a film scanner 40 and a digital printer 50. Although not shown, the apparatus 10 can also include an optical printer for printing photographic images on a photographic paper in a wet chemical process.

Figure 2:
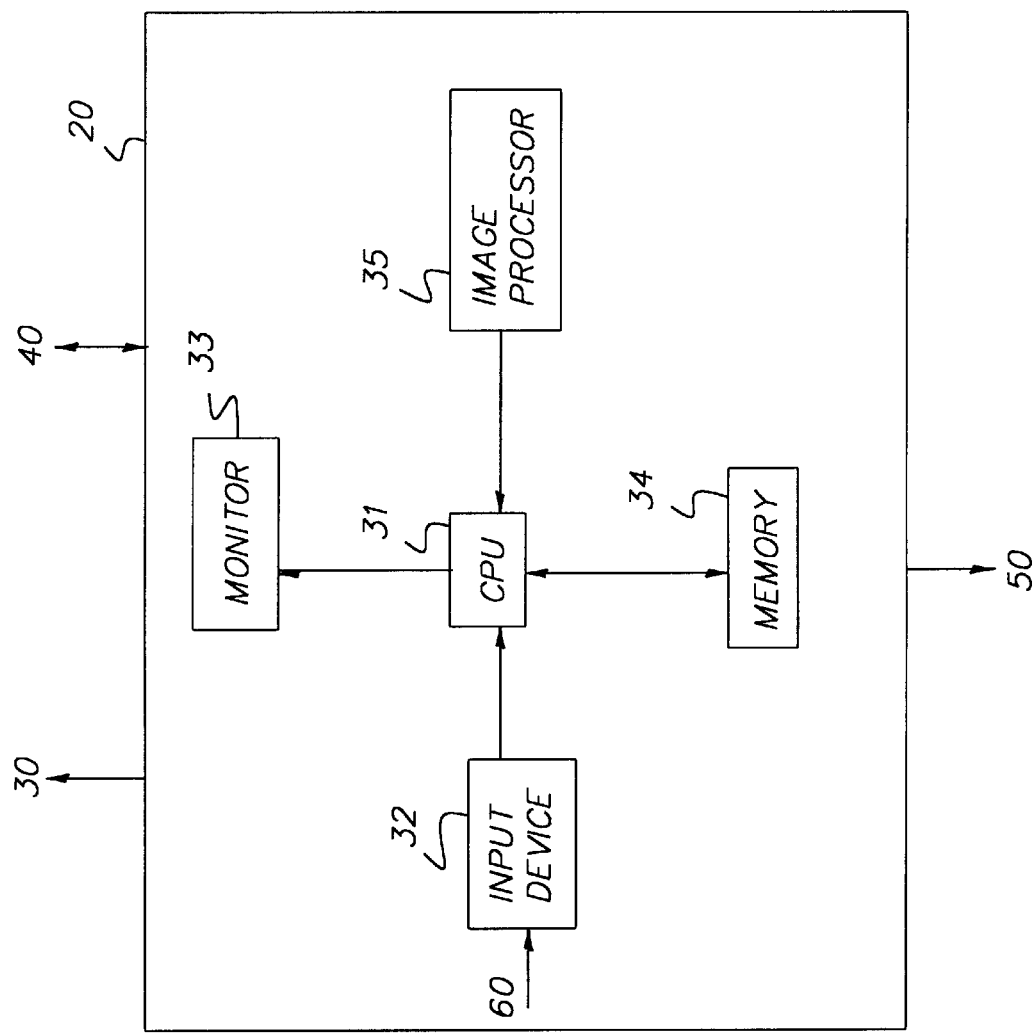
FIG. 2 shows the detailed components of the computer of FIG. 1.

The computer 20, shown in FIG. 2, includes a Central Processing Unit (CPU) 31, input device 32, such as a keyboard, and a mouse that receives user input information from the user 60, a monitor 33 for displaying user input information or authentication images, a memory 34 for storing digital images and user input information, and an image processor 35 for processing the digital images to embed information and conducting other image processing operations well known in the art.

Referring again to FIG. 1, a camera 70 records latent images of scenes, as described above. In the present invention, the term "scene" refers to any object that can be captured as an image on a photographic film. The film carrying the latent images is typically contained in a light sealed exposed film cassette 80 that is received by the film processor 30.

As is well known in the photographic field, the film processor 30 processes the film carrying the latent images in the exposed film cassette 80 in a wet chemical process. The exposed film is sequentially processed in several processing solutions: a developer solution, a bleach solution, a fixer solution, a washing solution, or a combination of bleach/fix solution and wash/stabilizer solution. Finally, the developed film is dried in a drying box. In the present invention, the film processor 30 can also use a dry process in which the digital images can directly be scanned from the films. The developed films 90 and 100 are sent to the film scanner 40 or an optical printer (not shown) for printing on a photographic paper.

The film scanner 40 scans the developed films 90 and 100 in a pixel-wise fashion. The optical densities of the analog photographic image are read at each pixel location, producing a digital image file. The digital image is a representation of its analog images on the developed film 90 and 100 and can be conveniently stored on the electronic memory 34. Digital images can be easily transferred and shared over the modern information channels such as the Internet. The digital image can also be printed by the digital printer 50 in a pixel-wise fashion to produce a photographic image on a receiver. Although not shown, another scanner can be included for digitizing images on a receiver. The digital image can also be provided by a digital camera 110, or an optical disk 120 such as Kodak's Picture CD or Kodak's Photo CD that is read by a CD drive 130.

The image processor 35 in the computer 20 then processes the digital images and embeds information into the digital images obtained by the film scanner 40. In the present invention, the embedded information is typically information associated with the image. In FIG. 1, different types of embedded information are represented by a "key" symbol. For example, the authentication information can be used to deter counterfeiting and illegitimate use.

The embedded information can include authentication information, the information selected by the user, and the sound information. The authentication information can include a watermark, copyright, and the name of the user or the photographer. In the present invention, the term "user input information" refers to the information selected or produced by the user 60 and input to the computer 20. The user input information can include the user's identification, the time, location, background of scene etc. The embedded information can also include sound information such as voice and music. The sound information can be recorded at the scene of the image capture or at the Microlab or Minilab, or can also be selected from an electronic memory.

The embedded information can be input to the computer 20 at the Microlab, Minilab or the Central Lab; it can also be produced or input from a remote location 140 such as a house through an information channel 150 such as the Internet. In FIG. 1, the "key" symbol next to the information channel 150 represents that the embedded information can be transferred in a secure fashion.

Figure 3:
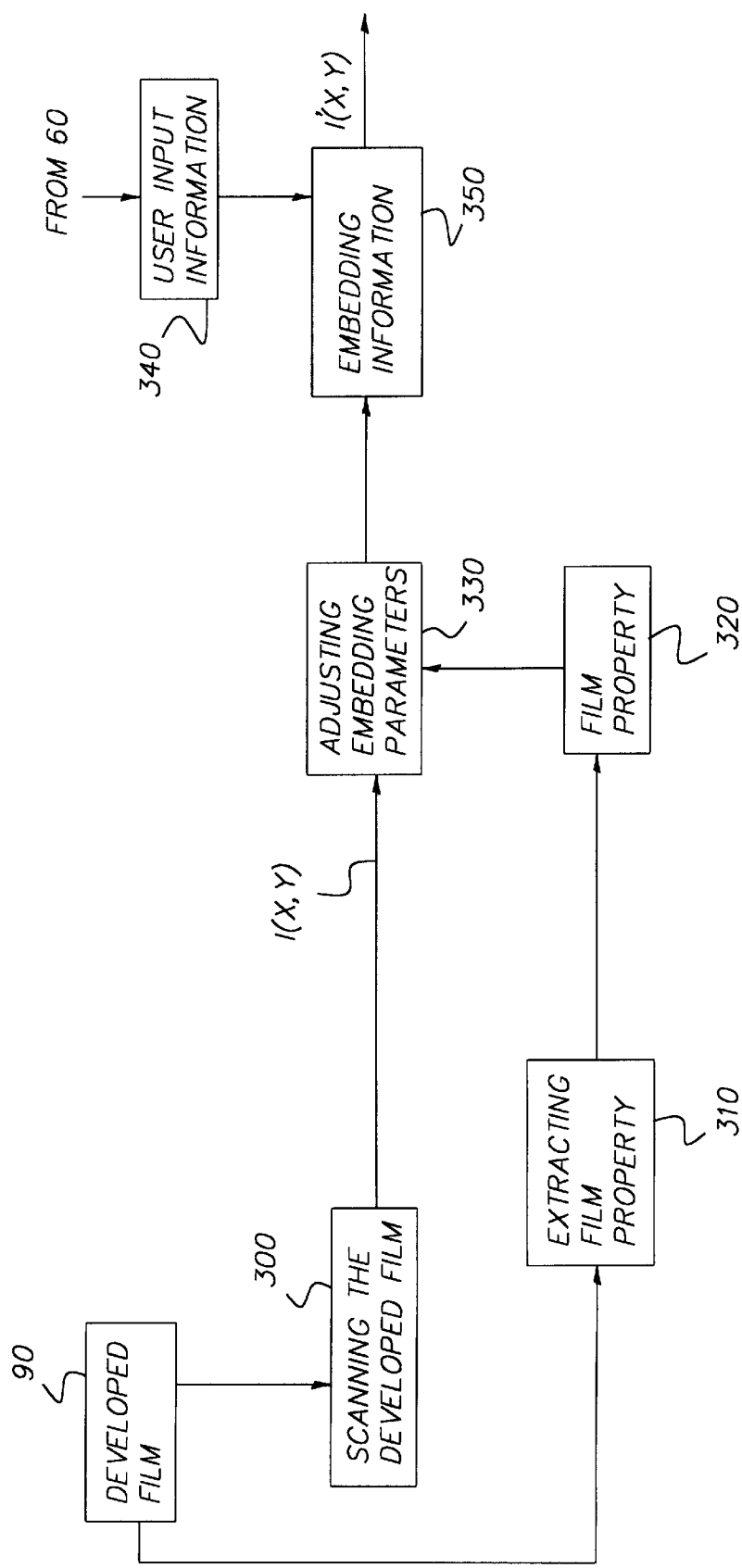
FIG. 3 is a flow diagram of the operations of the apparatus of FIG. 1.

FIG. 3 illustrates the flow chart of the operations of the apparatus in accordance with the present invention. The developed film in the developed film cassette 90 is scanned in box 300. A digital image I(x,y) is produced as a result. The film properties are extracted by the film property extraction device 25 in box 310. The film property 320 is produced in box 320. The film property 320 can be extracted from the magnetic coating layer on the APS film before the development of the exposed photographic film, or from the optical coding on the non-image areas of the photographic film after it is developed. The extracted film properties are stored in the memory 34 in the computer 20, which is accessible by the image processor 35 for information embedding. As described below, the parameters for embedding information in the digital image I(x,y) are adjusted in box 330 according to the film property 320. The user 60 produces or selects information in box 340. The user input information is also stored in memory 34. The user input information is embedded to the digital image I(x,y) using the adjusted embedding parameters in box 350 to produce a new digital image I'(x,y) that carries the embedded information.

The information is embedded into the digital image I(x,y) using parameters adjusted depending on the film property 320 so that the high image quality in the digital image I(x,y) (derived from the photographic film) is preserved in the digital image I'(x,y) with the embedded information. The film property 320 is also used for maximizing the amount and the reliability of the embedded information. For example, the amount of data embedded can be maximized according to the film speed without affecting the image quality. Films of higher speed have less light for exposure in a shorter period of time. In the photographic films, the silver halide emulsion grains acts like photon detectors. The high speed films use larger emulsion grain to absorb the increasingly sparse photons, which tends to produce more granularity (or fluctuations in optical densities) in the developed film.

Figure 4:
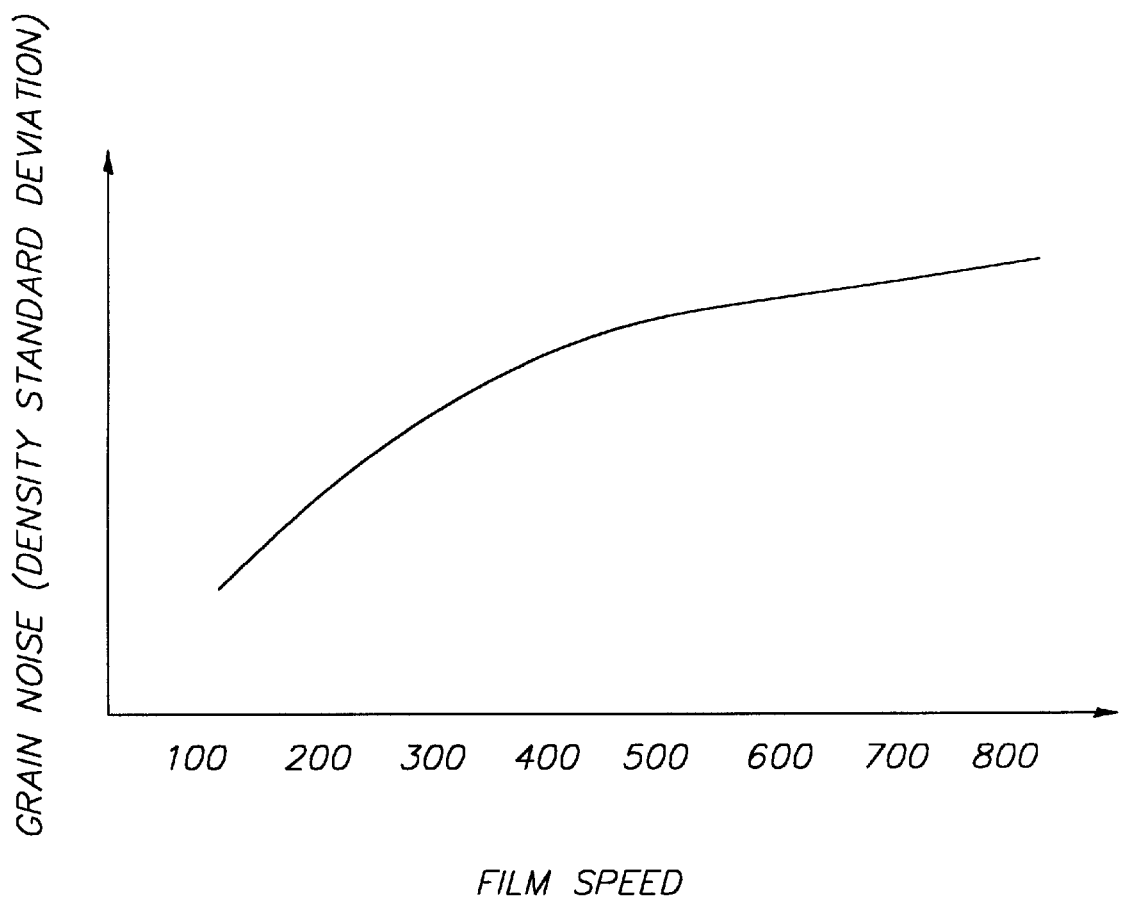
FIG. 4 shows a curve of mean-square deviation of the optical density as a function of the speed of a photographic film.

FIG. 4 is a graph showing that as film speed is increased, the standard deviation of the photographic noise increases. In the trade of photographic technologies, it is also well known that film granularity is also dependent on the film type: 35 mm, APS, negative or positive, and black and white, as well as exposure conditions.

In accordance with the present invention, the more noise a film-based image has, the more data can be embedded into the image without affecting the quality of the image. That means that more data can be embedded in an image developed from a high-speed film than from a lower speed film.

The visual impact of changes in an image is documented and has been facilitated in computer models of the human visual system (HVS). A practical and well-known model is the contrast sensitivity function (CSF), which relates to the signal contrast that is required for detection as a function of spatial frequency, noise, and other parameters. A basic description of the CSF can be found in chapter five of "Foundations of Vision," by Brian A. Wandell, Sinauer Associates Inc., Sunderland, Mass., 1995. This reference also includes CSF plots based on measured sensitivities. A number of CSF models have been described in the literature, and in a preferred embodiment of the present invention, specific use is made of a model described by Daly in "Application of a noise-adaptive contrast sensitivity function to image data compression," Optical Engineering, Volume 29, number 8, pages 979–987, August 1990. This CSF model shares characteristics similar to the experimentally measured data, e.g., the sensitivity decreases as an increasing function of both horizontal and vertical spatial frequency and background noise level. The exact form of the CSF derived from this model is dependent upon a number of viewing condition parameters, including viewing distance, adaptation light level, noise level, wavelength, and chromatic channel. By adjusting the amplitude of the embedded signal in accordance with the CSF, we can maximize the amount and quality of information embedded.

The information embedding in the digital images $I(x,y)$ in the present invention is determined by the stored film property 320 in memory 34 and the user input information 330. In the data embedding, a predetermined number of pixel values in the digital image is modified. The preferred algorithms in accordance with the present invention for forming non-visible information (message) in an image may be broken down into two parts, the process of embedding the message into an image and the process of extracting the message after the image has been used.

In the embedding part, the message (the user input information 330) and the carrier are convolved to form a scrambled signal. The scrambled signal then is scaled to ensure that the amplitude of the resultant scrambled message is not visually perceptible. Finally, the scrambled message is added to the image. The specific form of the convolution operation is referred to as circular convolution (see "Digital Signal Processing" by Alan V. Oppenheim and Ronald W. Schafer, Prentice-Hall, Inc., pp-101–115) which can be efficiently performed in either space domain (image domain) or Fourier frequency domain representations. The process of data embedding can be mathematically described as $$I'(x,y)=I(x,y)+\alpha(M(x,y)*C(x,y))$$

where $I(x,y)$ denotes the digital image digitized from the developed photographic film, $I'(x,y)$ denotes the final image containing the embedded data, $M(x,y)$ denotes the message that is to be embedded in the digital image $I(x,y)$, $C(x,y)$ denotes the carrier signal, $M(x,y)*C(x,y)$ denotes the scrambled image, $\alpha$ is a scale factor, and * denotes the process of circular convolution. The scale factor $\alpha$ is chosen to be small enough so that the message is visually undetectable. That is, the value of $\alpha$ is chosen in such a way that the maximum amplitude of the embedded signal does not exceed a pre-specified threshold. This threshold can be obtained by calculating the contrast associated with the CSF associated with a given film at typical viewing conditions of the final image.

Now, typically, the CSF is represented in the Fourier domain. This implies that the Fourier transform of the added message $(M(x,y)*C(x,y))$ should be pre-calculated. If the maximum value of the added information in the Fourier domain is always less than or equal to the contrast value associated with CSF, then the embedded signal will be invisible. The value $\alpha$, for which the maximum amplitude of the quantity $(M(x,y)*C(x,y))$ is obtained can be found through simple iterative means by starting with a very small value of $\alpha$ and incrementing it until the first value of the Fourier transform of the embedded message becomes the same level of as a point of in the contrast level associated with CSF.

The digital image $I'(x,y)$ carrying the embedded information can be used as input for the extraction. Or alternatively, the image on a receiver must be first scanned and corrected for rotation and scale to produce a digital image analogous to $I'(x,y)$. For maximum performance, the scanner should be set to a resolution high enough not to alias any of the hidden data. If the scanner induces an MTF loss (that is, the scanner attenuates some frequencies), a suitable compensation sharpening filter is preferably applied. The preferred method for correcting rotation and scale is disclosed in Honsinger, et al., "Method for detecting rotation and magnification in images", U.S. Pat. No. 5,859,920. After this, the scanned image $I'(x,y)$ is cross correlated with a replica of the carrier, $C(x,y)$, as described by the following:

$$M'(x,y)=I'(x,y) \otimes C(x,y)$$

where $\otimes$ denotes the operation of circular cross correlation.

To see how this recovers the message, replace $I'(x,y)$ with the embedding equation above to yield:

$$M'(x, y) = [I(x, y) + \alpha M(x, y) * C(x, y)] \otimes C(x, y)$$

$$= \underbrace{I(x, y) \otimes C(x, y)}_{Term1} + \underbrace{\alpha M(x, y) * [C(x, y) \otimes C(x, y)]}_{Term2}$$

The above relationship simply states that the recovered message consists of the sum of two components, one term is the cross-correlation of the digital image $I(x,y)$ with the carrier signal, and the second term is the autocorrelation of the carrier signal convolved with a scaled version of the digital message $I(x,y)$. Using a random carrier that is substantially uncorrelated with the digital image $I(x,y)$ can minimize the effect of the first term. From examining the second term, it is clear that the resolvability of the recovered message is affected by the autocorrelation of the carrier signal $C(x,y)$. Ideally, to achieve maximum resolvability, the autocorrelation of the carrier signal should be a delta function, $\delta(x,y)$, which from Fourier analysis theory is equivalent to suggesting that the carrier signal should contain all frequencies at equal amplitude. A carrier with these properties is disclosed in Honsinger, et al. in the patent application Ser. No. 08/848,112, "Method For Generating An Improved Carrier For Use In An Image Data Embedding Application".

In accordance with the present invention, the information embedding in box 350 in the digital image $I(x,y)$ can be implemented redundantly in a plurality of tiles in an image. The redundancy of the embedded information increased the reliability and signal-to-noise ratio when the embedded information is extracted. The number and the size of the tiles used in the embedding and extracting information are dependent on the film property 320 where the digital image $I(x,y)$ is developed from. For example, the 35 mm film and different APS formats (Classic, panoramic, HDTV) have different film frame dimensions and aspect ratios, as well as different granularity levels. The sizes and aspect ratio of the tiles used for information embedding in an image developed from these films are optimized to provide the most redundancy and thus reliability, and the highest signal-to-noise ratio.

The embedding and extracting information to and from the images I(x,y) digitized from the developed photographic films can also include techniques disclosed by Daly, et al. "Method for embedding digital information in an image" in U.S. Pat. No. 5,859,920, Honsinger, et al. in "Method For Detecting Rotation And Magnification In Images" in U.S. Pat. No. 5,835,639, and Honsinger, et al. in the patent application Ser. No. 08/848,112. Alternatively, the algorithms disclosed in Rhoads in U.S. Pat. No. 5,710,834, "Method And Apparatus Responsive To A Code Signal Conveyed Through A Graphic Image", can be used but the amount of information that can be embedded may be too limiting for some applications. These disclosures are herein incorporated.

The digital images I'(x,y) with embedded information can be sent to the digital printer 50 for printing printed image 180. The digital images with embedded information can also be sent to a CD writer 200 that writes these digital images on a writeable optical disk 210 such as a CD-R. The digital images I'(x,y) can also be stored on other similar storage media such as a solid-state memory card. The printed image 180 and the digital images stored on the optical disk 210 contain the embedded information that can be extracted. Depending on the type of the embedded information as described above, the extracted information can be used to authenticate the owner of the image, or used to describe information related to the capture of the image (time, location, occasion etc.), or used to play sound information associated with the image.

The invention has been described in detail with particular reference to certain preferred embodiments thereof, but it will be understood that variations and modifications can be effected within the spirit and scope of the invention.

PARTS LIST

| | |
|---|---|
| 10 | apparatus |
| 20 | computer |
| 25 | film property extraction device |
| 30 | film processor |
| 31 | CPU |
| 32 | input device |
| 33 | monitor |
| 34 | memory |
| 35 | image processor |
| 40 | film scanner |
| 50 | digital printer |
| 60 | user |
| 70 | camera |
| 80 | exposed film cassette |
| 90 | developed film cassette |
| 100 | developed film cassette |
| 110 | digital camera |
| 120 | optical disk |
| 130 | CD drive |
| 140 | remote location |
| 150 | information channel |
| 180 | printed image |
| 200 | CD writer |
| 210 | optical CD |
| 300 | scanning the developed film |
| 310 | extracting film property |
| 320 | film property |
| 330 | adjusting embedding parameters |
| 340 | user input |
| 350 | embedding information |

What is claimed is:

1. Apparatus for embedding information in a digital image digitized from a developed photographic film in response to a film property and information to be embedded into the digital image, comprising a) a scanner for scanning the image on the developed photographic film to produce the digital image;

b) means for storing the film property;

c) input means for storing information associated with the image and to be embedded in the digital image; and d) means responsive to the stored the film property and the associated information for modifying a predetermined number of pixel values with the associated information in the digital image so that the associated information is embedded in the digital image, wherein the embedded information can subsequently be extracted.

2. The apparatus of claim 1 wherein the modified pixels in the digital image do not substantially alter the quality of the digital image.

3. The apparatus of claim 2 further including means responsive to the modified digital image for printing a human visible image wherein the embedded information is invisible.

4. The apparatus of claim 1 further including means for storing the modified digital image on a medium which can be used for subsequent printing of the modified digital image.

5. The apparatus of claim 1 wherein the embedded information includes authentication information.

6. The apparatus of claim 1 wherein the embedded information includes user input information.

7. The apparatus of claim 1 wherein the embedded information includes sound information.

8. The apparatus of claim 1 wherein the film property includes one or more of the following: the film speed, the film type, the dimensional format of the film, and the exposure conditions.

9. Apparatus for embedding information in a digital image digitized from an exposed photographic film in response to a film property and user provided information to be embedded into the digital image, comprising a) means for developing the exposed photographic film to produce a developed photographic film and for extracting the film property related to the film;

b) a scanner for scanning the image on the developed photographic film to produce the digital image;

c) means for storing the extracted the film property;

d) user input means for providing and storing information associated with the image and to be embedded in the digital image; and e) means responsive to the stored the film property and the associated information for modifying a predetermined number of pixel values with the associated information in the digital image so that the associated information is embedded in the digital image, wherein the embedded information can subsequently be extracted.

10. The apparatus of claim 9 wherein the modified pixels in the digital image do not substantially alter the quality of the digital image.

11. The apparatus of claim 9 further including means responsive to the modified digital image for printing a human visible image wherein the embedded information is invisible.

12. The apparatus of claim 9 further including means for storing the modified digital image on a medium which can be used for subsequent printing of the modified digital image.

13. The apparatus of claim 9 wherein the embedded information includes authentication information.

14. The apparatus of claim 9 wherein the embedded information includes sound information.

15. The apparatus of claim 9 wherein the film property includes one or more of the following: the film speed, the film type, the dimensional format of the film, and the exposure conditions.

16. Apparatus for producing an image on a receiver which includes invisible embedded information in response to an image digitized from a developed photographic film, comprising a) a scanner for scanning the image on the developed photographic film to produce the digital image;

b) means for storing a film property of the developed photographic film;

c) user input means for providing and storing information associated with the image and to be embedded in the digital image;

d) means responsive to the stored the film property and the associated information for modifying a predetermined number of pixel values with the associated information in the digital image so that the associated information is embedded in the digital image; and e) printer means responsive to the modified digital image for printing a human visible image on the receiver wherein the embedded information is invisible and can subsequently be extracted.

17. The apparatus of claim 16 wherein the modified pixels in the digital image do not substantially alter the quality of the image on the receiver.

18. The apparatus of claim 16 wherein the embedded information includes authentication information.

19. The apparatus of claim 16 wherein the embedded information includes sound information.

20. The apparatus of claim 16 wherein the film property includes one or more of the following: the film speed, the film type, the dimensional format of the film, and the exposure conditions.

* * * * *